(12) United States Patent
Weller et al.

(10) Patent No.: US 12,296,774 B2
(45) Date of Patent: May 13, 2025

(54) VEHICLE-OCCUPANT-RESTRAINT SYSTEM COMPRISING AN AIRBAG

(71) Applicant: ZF AUTOMOTIVE GERMANY GMBH, Alfdorf (DE)

(72) Inventors: Christian Weller, Gschwend (DE); Christian Schmid, Waldstetten (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/562,000

(22) PCT Filed: May 17, 2022

(86) PCT No.: PCT/EP2022/063263
§ 371 (c)(1),
(2) Date: Nov. 17, 2023

(87) PCT Pub. No.: WO2022/243282
PCT Pub. Date: Nov. 24, 2022

(65) Prior Publication Data
US 2024/0239292 A1    Jul. 18, 2024

(30) Foreign Application Priority Data

May 19, 2021 (DE) ............... 10 2021 112 982.6

(51) Int. Cl.
*B60R 21/232* (2011.01)
*B60R 21/231* (2011.01)

(52) U.S. Cl.
CPC .. *B60R 21/232* (2013.01); *B60R 2021/23161* (2013.01)

(58) Field of Classification Search
CPC ........ B60R 21/232; B60R 2021/23161; B60R 2021/23308; B60R 2021/23192; B60R 2021/23138
See application file for complete search history.

(56) References Cited

U.S. PATENT DOCUMENTS 3,795,412 A * 3/1974 John .............. B60R 21/08
                                                180/274
4,169,613 A * 10/1979 Barnett .......... B60R 21/233
                                                280/739

(Continued)

FOREIGN PATENT DOCUMENTS

DE    29916526 U1    2/2000
DE    20208240 U1    10/2002

(Continued)

OTHER PUBLICATIONS

PCT International Search Report for corresponding international application No. PCT/EP2022/063263, with a mailing date of Sep. 6, 2022, pp. 1-6.

*Primary Examiner* — Paul N Dickson
*Assistant Examiner* — Shams Dhanani
(74) *Attorney, Agent, or Firm* — Tarolli, Sundheim, Covell & Tummino LLP

(57) ABSTRACT

A vehicle occupant restraint system includes a curtain-type airbag (12) which in a folded state is fastened to a roof area (22) of a vehicle and which, in the completely filled state, extends through a vehicle interior and in front of two occupants sitting next to each other or between two occupants sitting next to each other to protect them. The airbag (12) has a larger extension in an airbag longitudinal direction (L) than in an airbag transverse direction (Q) and includes at least two fixing sections (26) spaced apart in the airbag longitudinal direction (L) and spaced apart from a lateral roof area (27) for fastening on the roof side. Each of the fixing sections (26) comprises a gas inlet opening (28) via which filling gas flows into the airbag (12). The airbag (12) includes at least two fillable chambers (14) adjacent to each other in the airbag longitudinal direction (L), wherein each chamber (14) is associated with a vehicle occupant and the (Continued)

outer wall of each chamber (14) comprises a baffle (20) for cushioning the associated vehicle occupant.

14 Claims, 4 Drawing Sheets

(56) References Cited

U.S. PATENT DOCUMENTS

| | | | | |
|---|---|---|---|---|
| 9,446,735 | B1* | 9/2016 | Jayasuriya | B60R 21/231 |
| 9,994,182 | B1* | 6/2018 | Jaradi | B60R 21/2338 |
| 10,115,064 | B2* | 10/2018 | Schimmel | G06Q 10/063 |
| 10,647,286 | B1* | 5/2020 | Dennis | B60R 21/232 |
| 11,673,526 | B1* | 6/2023 | Moran | D03D 1/02 |
| | | | | 280/730.2 |
| 11,845,392 | B1* | 12/2023 | Faruque | B60R 21/2338 |
| 2004/0066022 | A1* | 4/2004 | Mori | B60N 2/888 |
| | | | | 280/730.1 |
| 2004/0188988 | A1* | 9/2004 | Wipasuramonton | |
| | | | | B60R 21/214 |
| | | | | 280/730.1 |
| 2005/0052004 | A1* | 3/2005 | Bakhsh | B60R 21/235 |
| | | | | 280/743.1 |
| 2005/0073135 | A1* | 4/2005 | Choi | B60R 21/232 |
| | | | | 280/730.1 |
| 2006/0097492 | A1* | 5/2006 | Bakhsh | B60R 21/232 |
| | | | | 280/730.2 |
| 2013/0161930 | A1* | 6/2013 | Moffitt | B60R 21/232 |
| | | | | 280/730.2 |
| 2014/0375033 | A1* | 12/2014 | Fukawatase | B60R 21/231 |
| | | | | 280/729 |
| 2015/0166002 | A1* | 6/2015 | Fukawatase | B60R 21/233 |
| | | | | 280/730.1 |
| 2017/0113646 | A1* | 4/2017 | Lee | B60R 21/2338 |
| 2017/0267204 | A1* | 9/2017 | Farooq | B60N 2/143 |
| 2017/0361802 | A1* | 12/2017 | Farooq | B60R 21/232 |
| 2018/0215338 | A1* | 8/2018 | Faruque | B60R 21/264 |
| 2018/0312130 | A1* | 11/2018 | Min | B60R 21/13 |
| 2019/0084517 | A1* | 3/2019 | Iyer | B60N 2/143 |
| 2019/0106073 | A1* | 4/2019 | Sundararajan | B60R 21/2338 |
| 2019/0202391 | A1* | 7/2019 | Cho | B60R 21/233 |
| 2019/0217804 | A1* | 7/2019 | Cho | B60R 21/233 |
| 2019/0366968 | A1* | 12/2019 | Park | B60R 21/214 |
| 2020/0086820 | A1* | 3/2020 | Gould | B60R 21/214 |
| 2020/0276954 | A1* | 9/2020 | Navarro Arranz | |
| | | | | B60R 21/2338 |
| 2020/0307495 | A1* | 10/2020 | Jimenez | B60R 21/232 |
| 2020/0307496 | A1* | 10/2020 | Jimenez | B60R 21/214 |
| 2020/0317155 | A1* | 10/2020 | Deng | B60R 21/23138 |
| 2020/0377052 | A1* | 12/2020 | Youssef-Agha | B60R 21/231 |
| 2021/0138996 | A1* | 5/2021 | Min | B60R 21/2646 |
| 2021/0197748 | A1* | 7/2021 | Jeong | B60R 21/2338 |
| 2022/0017037 | A1* | 1/2022 | Jeong | B60R 21/2338 |
| 2022/0144203 | A1* | 5/2022 | Sung | B60R 21/214 |
| 2022/0332274 | A1* | 10/2022 | Dinsdale | B60R 21/231 |
| 2022/0355760 | A1* | 11/2022 | Dinsdale | B60R 21/213 |
| 2023/0007863 | A1* | 1/2023 | Min | B60R 21/2338 |
| 2023/0256929 | A1* | 8/2023 | Nagasawa | B60R 21/21 |
| | | | | 280/729 |

FOREIGN PATENT DOCUMENTS

| | | |
|---|---|---|
| DE | 10115064 A1 | 11/2002 |
| DE | 602004008546 T2 | 5/2008 |
| DE | 102016104896 A1 | 10/2016 |
| DE | 102017101484 A1 | 8/2017 |
| DE | 102018102656 A1 | 8/2018 |
| DE | 102018200650 A1 | 7/2019 |
| DE | 102018116379 A1 | 8/2019 |
| DE | 102019126749 A1 | 4/2021 |

* cited by examiner

VEHICLE-OCCUPANT-RESTRAINT SYSTEM COMPRISING AN AIRBAG

RELATED APPLICATIONS

This application is a U.S. National Stage Application filed under 35 USC 371 claiming priority to Serial No. PCT/EP2022/063263, filed on 17 May 2022; which claims priority from German Patent Application DE 10 2021 112 982.6, filed 19 May 2021, the entireties of which are hereby incorporated herein by reference.

TECHNICAL FIELD

The invention relates to a vehicle occupant restraint system comprising an airbag.

BACKGROUND

In connection with considerations about autonomous driving, i.e., about vehicles which are controlled without the direct action by one of the vehicle occupants, it is suggested, inter alia, to design the previously rigidly set seating position of the vehicle occupants of driver and front passenger as well as of occupants in rear seats behind all of which are oriented toward the vehicle front in a more flexible manner. In this way, vehicle occupants can sit opposite each other and, thus, can also be oriented with their backs to the vehicle front, wherein the seat orientation possibly is also intended to be variable.

The protection of the vehicle occupants by conventional restraint systems whose airbags cover the steering wheel, the instrument panel and the side walls of the vehicle is not very well suited for those seating positions.

SUMMARY

It is the object of the invention to provide a vehicle occupant restraint system which can also be used for seating positions which deviate from the conventional arrangement.

This object is achieved by a vehicle occupant restraint system comprising a curtain-type airbag which is disposed, in a folded state, in a roof area of a vehicle and which, in the completely filled state, extends through a vehicle interior and in front of two occupants sitting next to each other or between two occupants sitting next to each other so as to protect them, wherein the airbag has a larger extension in an airbag longitudinal direction than in an airbag transverse direction. The airbag includes at least two fixing sections spaced apart in the airbag longitudinal direction and spaced apart from a lateral roof area for fastening on the roof side. Each of the fixing sections comprises a gas inlet opening through which filling gas flows into the airbag. The airbag has at least two fillable chambers juxtaposed in the airbag longitudinal direction, each chamber being associated with a vehicle occupant and the outer wall of each chamber comprising a baffle for cushioning the associated vehicle occupant.

According to the invention, the airbag is intended to form a structure substantially stable in itself inside the vehicle interior which is suspended from the roof area and allows to simultaneously cushion at least two vehicle occupants.

All fillable chambers have a volume that is suitable for cushioning a vehicle occupant, and the internal pressure of all fillable chambers has to be selected so that the vehicle occupant can be sufficiently captured when he/she impacts on the baffle.

The two juxtaposed fillable chambers advantageously are directly structurally interconnected to increase the inherent stiffness of the airbag. In the simplest case, this connection is made via the outer wall of the chambers which may be designed, e.g., as a continuous fabric layer on both front faces of the airbag extending perpendicularly to the airbag transverse direction forming a front and a back of the airbag.

Preferably, the airbag includes one single fixing section for each of the fillable chambers. It has turned out to be sufficient to fasten the airbag to the roof area exclusively via said fixing sections.

The roof area constitutes the surface of the vehicle roof, while the lateral roof area describes the transition from the actual roof to a vehicle side wall. Hence, the airbag is fastened spaced apart from the side walls of the vehicle.

In the case of restraint, usually all chambers are filled simultaneously.

All fillable chambers may have the same shape and the same volume, but they might also vary. This has to be adapted to the respective vehicle geometry at the skilled person's discretion.

Here, the direction in which the two fillable chambers are adjacent defines the airbag longitudinal direction. Accordingly, an airbag transverse direction is directed perpendicularly to the airbag longitudinal direction and to the vertical direction of the vehicle. The extension of the airbag along the airbag transverse direction is referred to as the depth of the airbag here.

The depth of the airbag perpendicular to the baffle is selected to be more than 25 cm, for example, to achieve high inherent stability of the airbag in the filled state.

As a rule, the front and back of the airbag in the completely filled state are oriented substantially in parallel to the vehicle vertical direction.

The two fixing sections and the two adjacent fillable chambers provide the airbag in the filled state with a high degree of inherent stability, even with respect to a rotation about the vehicle vertical axis.

Therefore, it is possible to dispose the airbag in the vehicle even at those positions where it is suspended at least substantially freely in the vehicle interior, as it does not have to bear fully against a vehicle structure such as a vehicle side wall by a front face opposite to the baffle. In particular, a front and an opposite back of the airbag can be positioned in the vehicle interior in the completely filled state of the airbag without being supported.

In a possible application, the airbag is arranged so that the airbag longitudinal direction is located in a vehicle transverse direction. The filled airbag then extends substantially in a plane spanned by the vehicle transverse direction and the vehicle vertical direction. Then the baffles are oriented so that the airbag can cushion two vehicle occupants sitting next to each other when they move forward along the vehicle longitudinal direction.

In a specific application, the filled airbag is interposed between vehicle seats facing each other, wherein two vehicle seats at a time are arranged in parallel so that vehicle occupants sit opposite to each other in opposite vehicle seats, with a respective fillable chamber of the airbag being located between two opposite vehicle seats. This arrangement is of particular advantage for specific autonomously driving vehicles.

In a different application, the airbag is used in conventional vehicles, the airbag being arranged, for example, so that in the filled state it extends in front of the front seats between the steering wheel and the instrument panel and the vehicle occupants. It is also possible to dispose the airbag in front of the rear seats so that it is positioned between the seatbacks of the seats in front and the vehicle occupants.

For stabilizing the filled airbag additionally in the vehicle interior, the extension of the airbag in the airbag longitudinal direction can be so large that the completely filled airbag with its longitudinal sides bears against opposite vehicle components and, thus, even further reduces rotation of the airbag about the vehicle vertical direction. A tight fixation of the airbag to the vehicle components is not provided so that, even in this variant, the airbag is fastened via its fixing sections only. The vehicle components may be side walls of the vehicle, for example.

The longitudinal sides of the airbag are located at opposite longitudinal ends of the airbag and are preferably formed by specific support surfaces. For example, a strip-shaped cut portion which is connected to the front and the back may be provided. In this case, the longitudinal sides also increase the depth of the airbag at the outer edge of the airbag so that the airbag offers a sufficient depth up to the longitudinal sides for cushioning a vehicle occupant.

In general, the airbag may have a modular design, wherein each of a fillable chamber and a fixing section together form a subunit and at least two subunits are juxtaposed in the longitudinal direction. All subunits have an identical shape, for example. In a preferred embodiment, the airbag is made of two subunits, but also embodiments in which three or more subunits are juxtaposed are conceivable.

A separate inflator is preferably associated with each gas inlet opening of the airbag. The inflator in this case can be arranged in direct vicinity of the fixing section at the roof area and can be directly connected to the gas inlet opening. However, it would also be conceivable to provide a central gas supply for the whole airbag.

The internal pressure of all fillable chambers is preferably equal in the completely inflated state. If the fillable chambers have identical geometries, the same gas volume is supplied to each fillable chamber in this case.

In a preferred variant, each fixing section merges into the fillable chamber via a neck forming an inlet passage, the necks of neighboring fillable chambers being spaced apart from each other. In the transition between two neighboring fillable chambers, a height of the airbag along the vehicle vertical direction is preferably reduced to the height of the baffle or to a lower height so as to save filling volume in an area which is not required to cushion the vehicle occupant. Hence, the airbag reaches to the roof area only at the fixing sections.

Neighboring fillable chambers are in fluid communication with each other in a possible embodiment. This allows for gas exchange between the two fillable chambers. The fluid communication can permanently exist. In a different variant, an internal partition having at least one overflow opening is interposed between two neighboring fillable chambers, the gas flow being variable by the overflow opening. For example, the overflow opening can be opened or closed using a closure mechanism. The closure mechanism comprises a pyrotechnical actuator, for example, which releases a tether disposed on a door closing the overflow opening.

One possible application consists in closing the overflow opening to a fillable chamber, if the vehicle seat associated with said fillable chamber is not occupied. This ensures that the airbag always behaves in the same way when it cushions a vehicle occupant irrespective of whether or not all vehicle seats are occupied.

For cushioning the vehicle occupant more gently and specifically for reducing the load on the head of the vehicle occupant, a cutting of a front of the airbag can be composed of plural individual cut portions, wherein an excess fabric is resulting vis-à-vis a surface enclosed by a peripheral edge of the cutting, and wherein a tether is fastened to the inner face of the baffle so that an indentation is formed in the baffle in the completely filled state of the airbag. The vertical or horizontal pocket formed in this way is located particularly in the area where the head is to be cushioned. Due to the shape of the cut parts, a shape which is three-dimensional per se and cannot be flatly spread on the whole is resulting for the front.

It is possible to compose the front of a total of only two cut parts.

Unless the back is also intended for cushioning vehicle occupants, one single flat cut part can be used for the back.

It would also be conceivable, however, to provide the airbag with baffles both on the front and on the back. This is advantageous, for example, when the airbag is used in an autonomously driving vehicle which can reverse its driving direction and, thus, has no definite front end.

As a matter of course, it is also possible in total to connect the front and the back in the interior of the airbag by one or more tethers to further increase the inherent stability of the airbag. Those tethers can be freely arranged at the skilled person's discretion.

BRIEF DESCRIPTION OF THE DRAWINGS

Hereinafter, the invention shall be described in detail by way of an embodiment and with reference to the attached Figures, wherein.

DESCRIPTION

Figure 1:
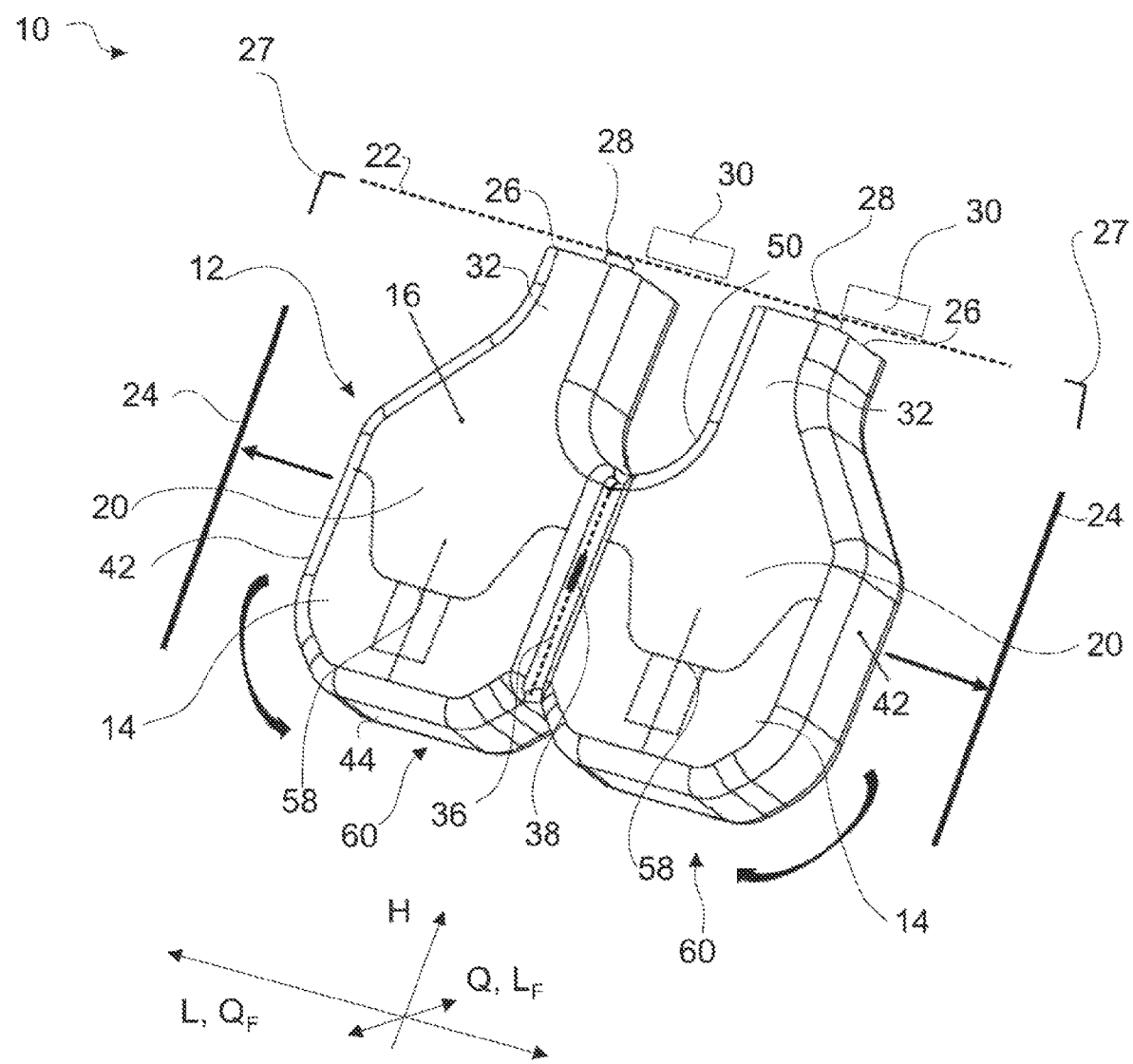
FIG. 1 shows a schematic view of a vehicle occupant restraint system according to the invention comprising an airbag in the completely filled state.

FIG. 1 illustrates a vehicle occupant restraint system 10 comprising an airbag 12.

The airbag 12 comprises two fillable chambers 14 juxtaposed in an airbag longitudinal direction L.

Figure 2:
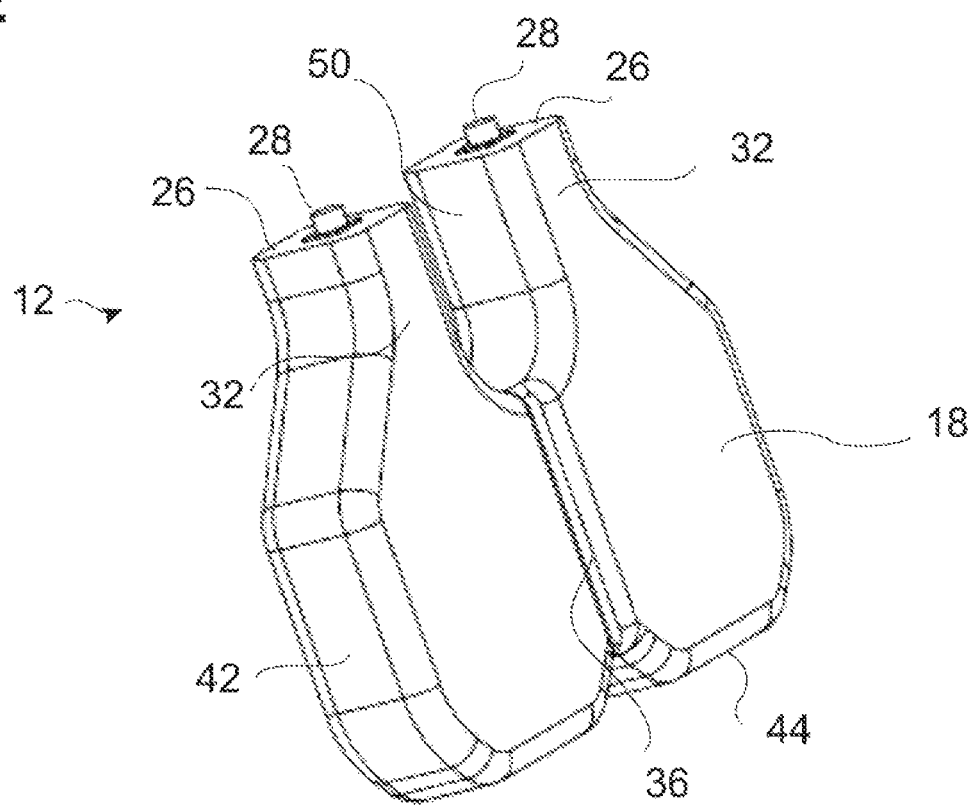
FIG. 2 shows a schematic perspective view of the airbag of FIG. 1 as viewed from the back thereof.

In an airbag transverse direction Q perpendicular to the airbag longitudinal direction L and to a vehicle vertical direction H, the airbag 12 is delimited by two opposed front faces which are referred to as front 16 and back 18 here (see also FIG. 2).

At the front 16 each of the fillable chambers 14 includes a baffle 20 for cushioning an associated vehicle occupant (not shown).

In the example shown in FIG. 1, the airbag 12 is disposed in the vehicle so that, in the completely filled state of the airbag 12, the airbag longitudinal direction L is oriented along a transverse direction QF of the vehicle. The airbag transverse direction Q correspondingly extends in a longitudinal direction LF of the vehicle. In FIG. 1, the vehicle is indicated only by ∧∧∧∧∧∧∧∧∧∧ a roof area 22 and two parallel side walls 24.

At its upper end relative to the vehicle vertical direction H, each of the fillable chambers 14 merges into a fixing section 26 which is tightly mounted on the roof area 22.

The fixing sections 26 of the individual fillable chambers 14 are fastened spaced apart from each other to the roof area 22 and all of them are located along the airbag longitudinal direction L and, thus, along the vehicle transverse direction QF here.

The positions at which the fixing sections 26 are fastened to the roof area, are spaced apart from a lateral roof area 27 which describes the transition from the roof area 22, i.e., the actual vehicle roof, to the vehicle side wall 24.

The fixing sections 26 form the only fastening points of the airbag 12 on the vehicle.

Each fixing section 26 includes a gas inlet opening 28 which is in fluid communication with an inflator 30 which in a case of restraint supplies filling gas for filling the respective fillable chamber 14.

The filling gas flows from the fixing section 26 initially through a narrow neck 32 forming an inlet passage, and from there into an area widened with respect to the airbag longitudinal direction L which includes the baffle 20.

The airbag 12 deploys from the roof area 22 substantially vertically downwards while it fills completely.

In the completely filled state, the front 16 and the back 18 are oriented substantially in parallel to the vehicle vertical direction H.

In the shown example, the airbag 12 includes two fillable chambers 14 adjacent in the airbag longitudinal direction L on each of which a baffle 20 is formed and each of which is fixed to the roof area 22 via a neck 32 having its own fixing section 26 which has a respective separate gas inlet opening 28. In this example, a separate inflator 30 is associated with each of the fillable chambers 14.

In the area of the respective baffle 20, the two adjacent fillable chambers 14 are directly structurally interconnected, as the fabric layers forming the front 16 and the back 18 extend continuously via both fillable chambers 14.

The height of the airbag 12 is reduced between the two necks 32 approximately to the height of the baffle 20. The airbag 12 thus extends in the area of the respective neck 32 to the roof area 22 only.

In the interior of the airbag 12, tethers which are not shown may be disposed at the skilled person's discretion to define the desired three-dimensional shape of the completely filled airbag 12.

The two neighboring fillable chambers 14 are permanently fluid-communicated in a possible variant.

In another variant, however, an inner partition 36 is provided which is spanned in one of the vehicle vertical direction H and the airbag transverse direction Q and which includes an overflow opening 38. In the overflow opening 38, a closure mechanism (not shown) is disposed via which the overflow opening 38 can be selectively closed or opened. For this purpose, the closure mechanism is connected, for example via a tether, to a pyrotechnical actuator which, under certain circumstances, is triggered in a situation of restraint and releases the tether so that the overflow opening 38 opens.

The closure mechanism is connected, e.g., to a control unit receiving signals from a seat occupation sensor. In a possible application, the overflow opening 38 remains opened when all vehicle seats associated with the airbag 12 are occupied by passengers. If, however, one of the seats is not occupied, the overflow opening 38 is closed so that the airbag 12 behaves in the same way independently of the seat occupation when the occupant impacts on the airbag.

A depth of the airbag 12 defined by the dimension of the filled airbag 12 in the airbag transverse direction Q is approximately constant here over the entire length of the airbag 12 in the airbag longitudinal direction L.

Figure 7:
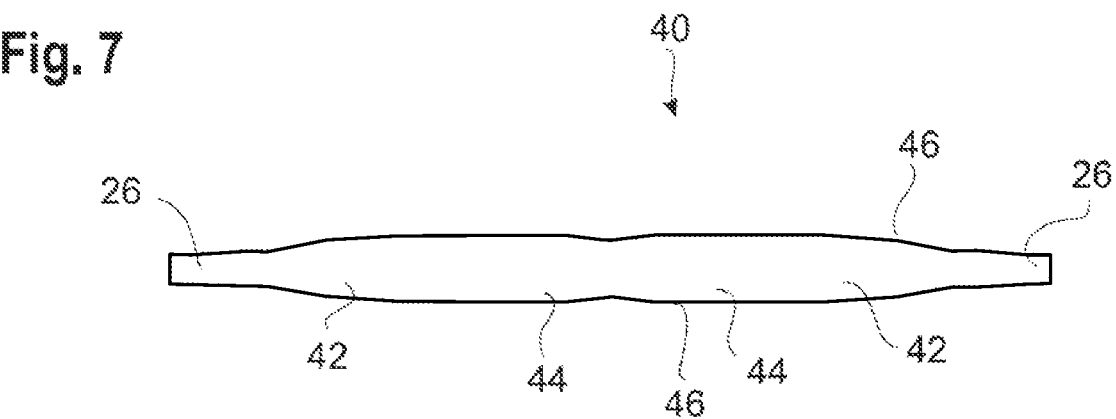

This is achieved by a cut portion 40 which defines the longitudinal sides 42 at the opposite longitudinal ends and the bottom 44 of the airbag 12. Said cut portion 40 is strip-shaped and is shown in FIG. 7. In the central part forming the bottom 44 and the longitudinal sides 42 in the finished airbag 12, the cut portion 40 has a substantially constant width between opposite edges 46. The width is reduced at the longitudinal ends forming the exterior of the necks 32.

Figure 3:
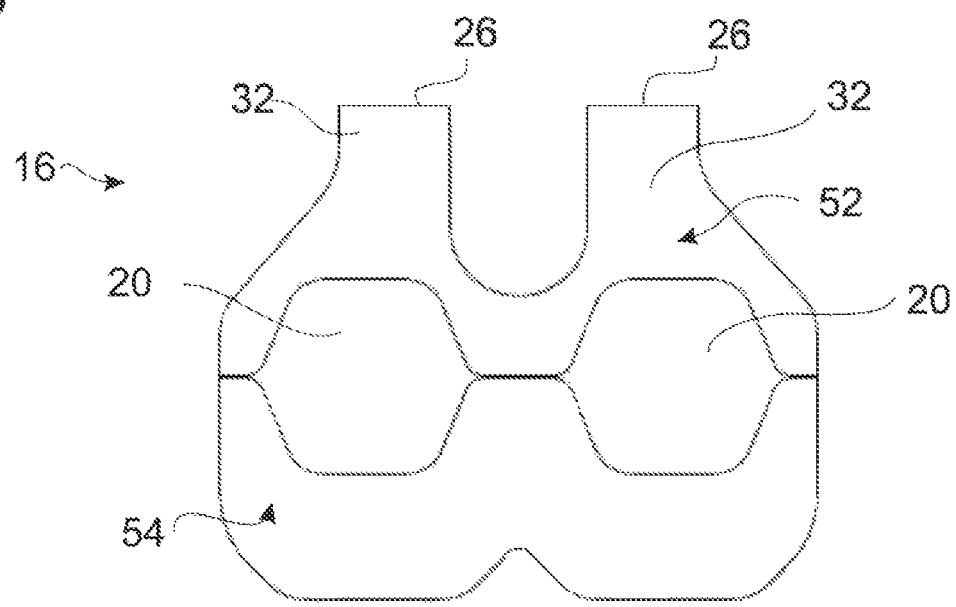
FIG. 3 shows a schematic view of a cutting of a front of the airbag of FIG. 2.
Figure 6:
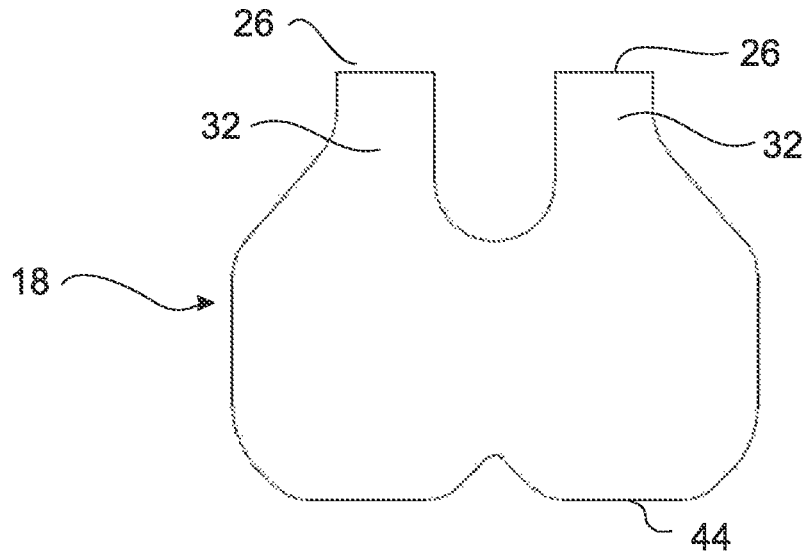

FIG. 3 illustrates the front 16 and FIG. 6 illustrates the back 18, in each case as a cutting before it is connected to the cut portion 40. For the manufacture of the airbag 12, the peripheral edges of each of the front 16 and the back 18 are connected, such as sewn, to the opposite edges 46 of the cut portion 40.

In the finished airbag 12, the cut portion 40 extends along the outer periphery of the airbag 12 from a fixing section 26 via one of the longitudinal sides 42, the bottom 44 and the opposite longitudinal side 42 to the other fixing section 26.

Figure 8:
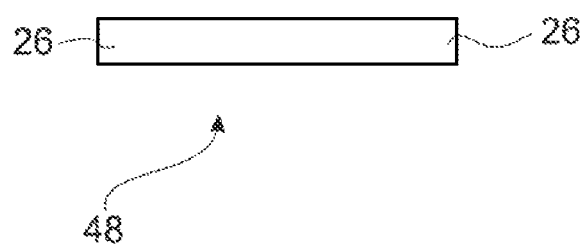

Another cut portion 48 shown in FIG. 8 connects the two fixing sections 26 at an upper side 50 of the airbag 12 opposite to the bottom 44.

The depth of the airbag is substantially defined by the distance of the two edges 46 of the cut portion 40 in the area of the baffles 20 and can be approximately constant over the length of the airbag 12.

The back 18 in this case is formed by one single flatly spreadable cut portion, as illustrated in FIG. 6.

Figure 4:
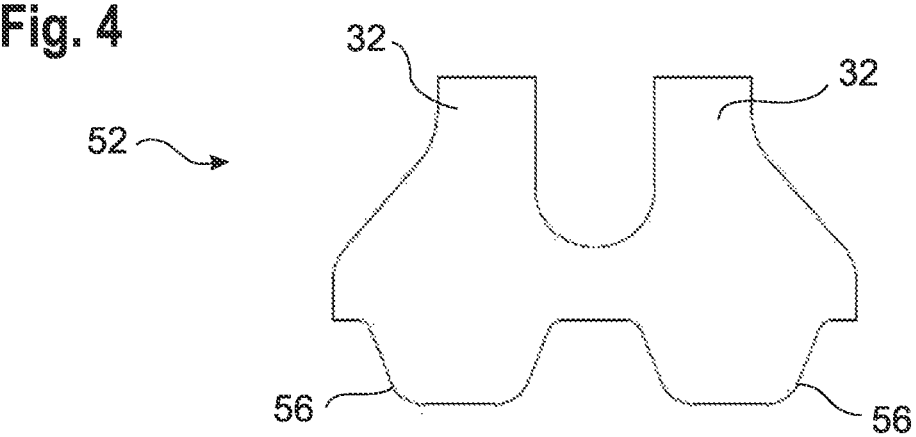
FIGS. 4 to 8 show further cut portions of the airbag of FIG. 2.
Figure 5:
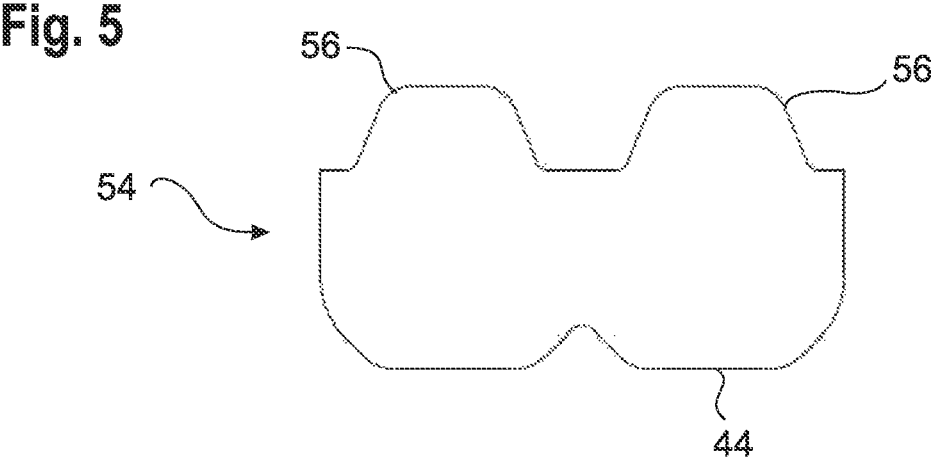

The front 16, on the other hand, is composed of two cut portions 52, 54 which are shown in FIGS. 4 and 5.

The cut portion 52 on one side defines the areas of the front 16 forming the necks 32. On the opposite side, two projections 56 are formed.

The cut portion 54 on one side defines the area of the front 16 adjacent to the bottom 44 of the airbag 12. On the opposite side, likewise two projections 56 are formed, wherein all projections 56 take an identical geometric shape.

The projections 56 of the cut portion 52 are tightly connected, such as sewn, to the projections 56 of the cut portion 54 at their peripheral edges. Thus, on the front 16 in the area of the projections 56, an excess material is formed vis-à-vis an imaginary surface enclosed by the peripheral edge of the front 16, and the front 16 as a whole is no longer flatly spreadable. The projections 56 are located approximately in the center of the respective baffle 20 of a fillable chamber 14.

At their inside, the projections 56 are connected to a tether (not shown) which is fastened, for example, to the back 18 and pulls the excess material inwards. In this way, in the completely filled airbag 12 an indentation or pocket 58 is formed in the respective area of the baffle 20. Said pockets 58 are positioned so that they are located in an area in which a head of a vehicle occupant hits the baffle 20 so as to allow for gentler cushioning.

The dimensions of the airbag 12 along the airbag longitudinal direction L are selected, in the example shown here, so that the longitudinal sides 42 can bear against the side walls 24 of the vehicle. However, no tight fixation is provided at the side walls 24 or the vehicle seats, for example.

Apart from being supported on the side walls 24, the airbag 12 in the completely filled state is suspended substantially freely in the vehicle interior here.

This arrangement is used, for example, in a vehicle in which four vehicle occupants sit opposite to each other in pairs, wherein two of the vehicle occupants sit in the driving direction and the other two vehicle occupants sit against the driving direction. The airbag 12 is disposed on the roof area 22 so that it deploys between the vehicle occupants sitting opposite to each other, the baffles 20 facing the vehicle occupants sitting in the driving direction. In a case of restraint, the forward movement of those vehicle occupants is stopped by the airbag 12 as they are cushioned by the baffles 20.

In another variant, the airbag 12 is used in a conventional vehicle in which all vehicle occupants sit in the driving direction. For example, the airbag 12 may be arranged at the roof area 22 in front of the occupants sitting in the front seats and may deploy between said occupants and the steering wheel and the instrument panel, respectively. In a different example, the airbag 12 is positioned in front of the occupants sitting in the rear seats and deploys between said occupants and the seatbacks of the front seats.

Thus, the airbag 12 can also be used in vehicles in which the vehicle seats can be rotated relative to the vehicle longitudinal direction LF.

Also, other applications would be conceivable, wherein the airbag longitudinal direction L need not absolutely coincide with the vehicle transverse direction QF.

In particular, a respective fillable chamber 14 can form a subunit 60 with a fixing section 26, and at the skilled person's discretion any number of subunits 60 may be lined up along the airbag longitudinal direction L. The airbag 12 therefore can be employed even in vehicles in which more than two vehicle occupants sit next to each other.

Due to its inherent stability which is achieved by the communicated fillable chambers 14 and the fixing sections 26 by which the airbag 12 is fastened to the roof area 22 of the vehicle, as well as, where appropriate, the support of the longitudinal sides 42 of the airbag 12 on components fixed to the vehicle such as the side walls 24, a vehicle occupant restraint system 10 is provided which offers proper protection of the vehicle occupants for different seat orientations.

The invention claimed is:

1. A vehicle occupant restraint system comprising a curtain-type airbag which in a folded state is fastened to a roof area of a vehicle and which, in a filled state, is configured to extend transversely across a vehicle interior and to receive two or more vehicle occupants, wherein the airbag comprises:
   a front panel that forms a front of the airbag configured to receive the occupants;
   a back panel that forms a back of the airbag, opposite the front; and
   a strip-shaped cut portion that forms sides of the airbag that extend between the front and back panels, the cut portion having a first longitudinal edge connected along a periphery of the front panel, and a second longitudinal edge connected along a periphery of the back panel, wherein the front panel, back panel, and cut portion define first and second inflatable chambers, each of which are configured to receive a corresponding one of the vehicle occupants;
   wherein the front panel comprises an upper cut portion and a lower cut portion that are interconnected to define the front panel;
   wherein the upper cut portion includes upper portions that, along with corresponding portions of the back panel, help define narrowed neck portions of each inflatable chamber, each neck portion being configured as a fixing portion for securing the airbag to the vehicle roof and as a gas inlet opening for receiving filling gas flowing into the airbag;
   wherein the lower cut portion includes a lower portion that, along with a corresponding portion of the back panel, helps define a lower end portion of the airbag;
   wherein the upper cut portion comprises projections that extend down from a lower edge of the upper cut portion, and the lower cut portion comprises projections that extend up from an upper edge of the lower cut portion;
   wherein corresponding projections of the upper cut portion and lower cut portion are interconnected along their respective edges to form the front panel, the interconnected projections forming a baffle of the first chamber configured to receive the vehicle occupant corresponding to the first chamber, and a baffle of the second chamber configured to receive the vehicle occupant corresponding to the second chamber.

2. The vehicle occupant restraint system according to claim 1, wherein the airbag is arranged so that the airbag longitudinal direction is located in a vehicle transverse direction.

3. The vehicle occupant restraint system according to claim 2, wherein the filled airbag is interposed between vehicle seats facing each other, wherein two vehicle seats are arranged in parallel, with a fillable chamber being located between each of two opposite vehicle seats.

4. The vehicle occupant restraint system according to claim 2, wherein the extension of the airbag in the airbag longitudinal direction is so large that the completely filled airbag with its longitudinal sides bears against opposite vehicle components.

5. The vehicle occupant restraint system according to claim 1, wherein each fixing section merges into the fillable chamber via a neck forming an inlet passage, the necks being spaced apart from each other.

6. The vehicle occupant restraint system according to claim 1, wherein neighboring fillable chambers are in fluid communication with each other.

7. The vehicle occupant restraint system according to claim 6, wherein between two neighboring fillable chambers an internal partition including at least one overflow opening is arranged, the gas flow through the overflow opening being variable.

8. The vehicle occupant restraint system according to claim 1, wherein each fillable chamber and fixing section form a subunit and at least two subunits are juxtaposed in the airbag longitudinal direction.

9. The vehicle occupant restraint system according to claim 1, wherein a separate inflator is associated with each gas inlet opening.

10. The vehicle occupant restraint system according to claim 1, wherein interconnected projections forming the baffles render the front panel unable to be spread flatly.

11. The vehicle occupant restraint system according to claim 1, wherein the cut portion is configured to give the airbag a substantially uniform thickness between the front and back panels.

12. The vehicle occupant restraint system according to claim 1 wherein the airbag has a larger extension in an airbag longitudinal direction than in an airbag transverse direction, and wherein the fixing sections are spaced apart in the airbag longitudinal direction and spaced apart from a lateral roof area for fastening on the roof side.

13. The vehicle occupant restraint system according to claim 12, wherein the airbag front and the airbag back in the completely filled state of the airbag are positioned in the vehicle interior without being supported.

14. The vehicle occupant restraint system according to claim 12, wherein on the inner face of the baffle a tether is fastened so that an indentation is formed in the baffle in the completely filled state.

\* \* \* \* \*